United States Patent Office 3,432,038
Patented Mar. 11, 1969

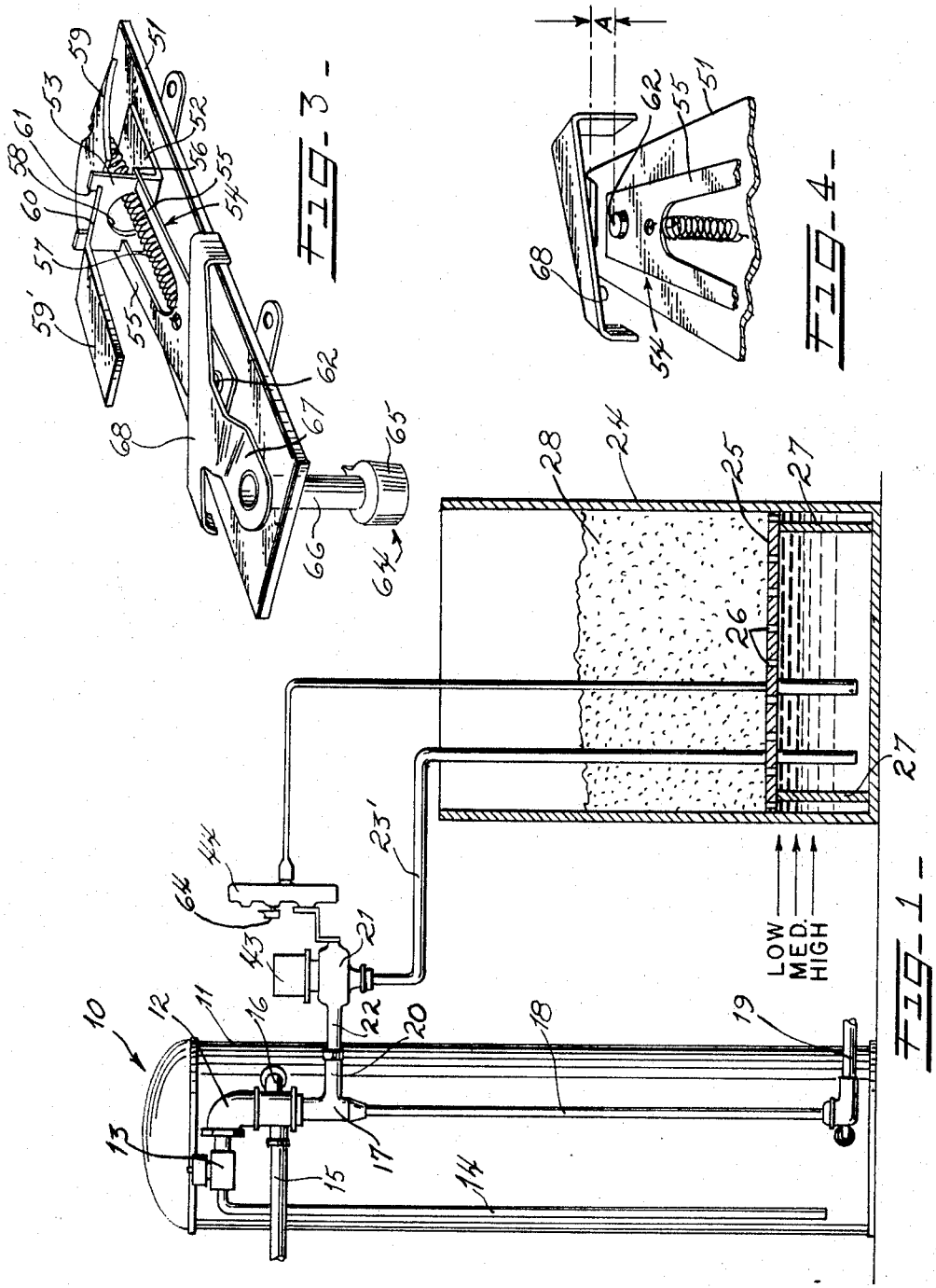

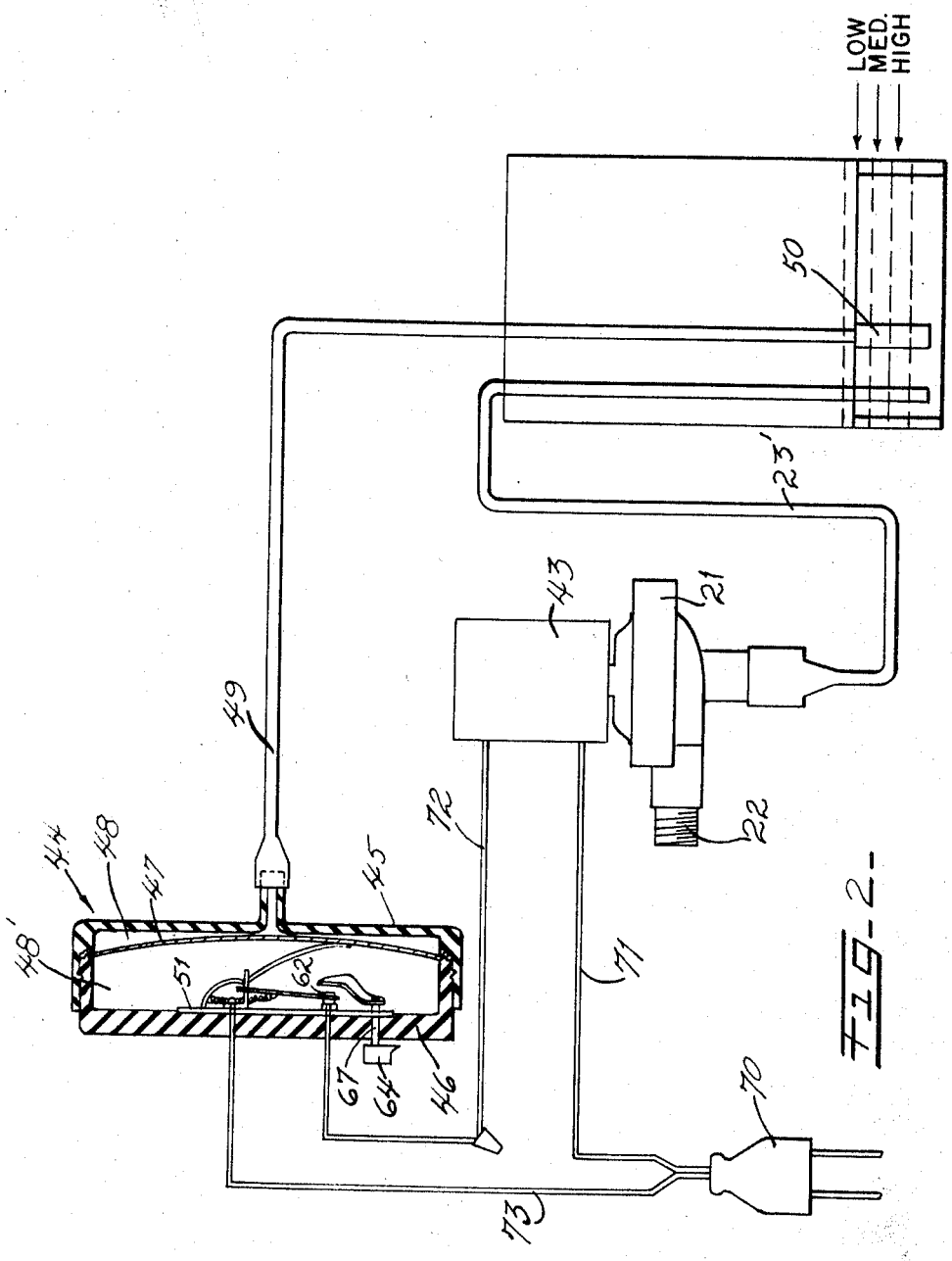

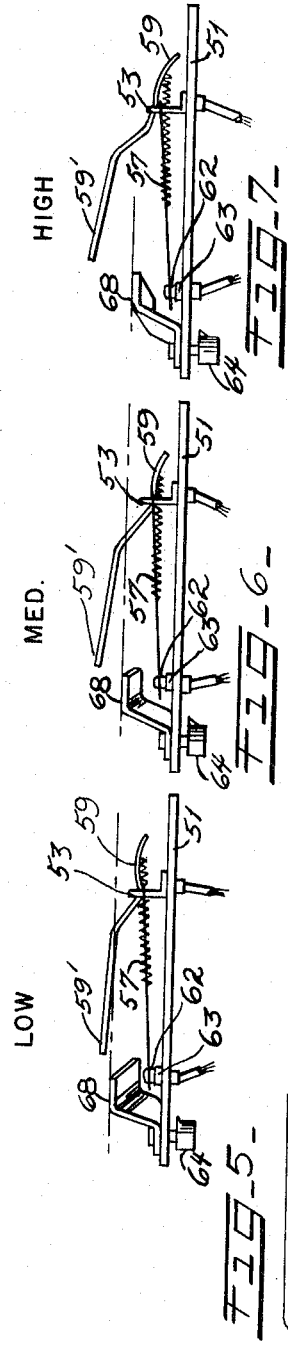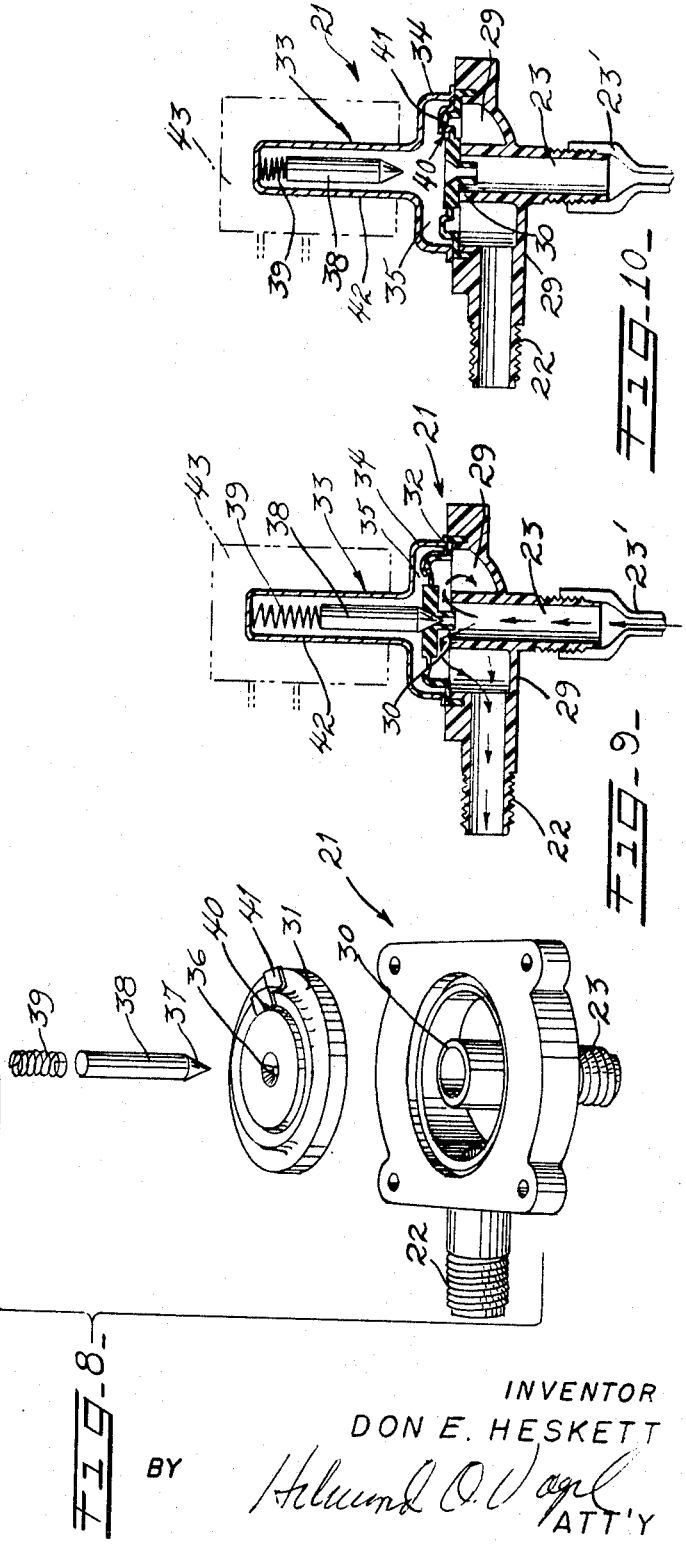

3,432,038
PRESSURE RESPONSIVE DEVICE FOR CONTROLLING LIQUID LEVEL IN TANKS
Don E. Heskett, P.O. Box 262,
Villa Park, Ill. 60181
Filed Nov. 5, 1964, Ser. No. 409,092
U.S. Cl. 210—96                    27 Claims
Int. Cl. B01d 21/00

ABSTRACT OF THE DISCLOSURE

A pressure responsive device for controlling the brine level in a brine tank comprising a water softening tank and a brine tank and vacuum means for transferring the brine water from the brine tank to the water softening tank and solenoid operated valve means for controlling such brine flow including a flexible diaphragm valve opened and closed in response to fluid pressure and a solenoid plunger cooperative with the diaphragm valve to vary the differential pressures across the diaphragm valve, and a pressure responsive switch responsive to changes of the liquid level in the brine tank for supplying brine to the water softener and time setting means for determining the amount of brine to be transferred to the water softening tank and controlling the over-center switch arrangement of the pressure responsive switch.

---

This invention relates to an improvement in water conditioning systems and more particularly to an improved device for controlling the liquid level in a brine tank.

In applicant's Patent 3,130,154 patented Apr. 21, 1964, an improved water conditioning system is disclosed wherein the liquid level in the brine tank is controlled in response to the pressure exerted within a pressure chamber combined with an electrical switch so that an accurate and positive control is provided during the brine cycle and also during the cycle in which the brine tank is again filled with liquid. It is a prime object of the present invention to provide for an improved pressure responsive control for a fluid transfer system or water conditioning system wherein the amount of brine which is desired to be removed from the tank can accurately be predetermined by setting a switch so that a variety of quantities of brine may be removed and an accurate control therefor be provided.

Still another object is to provide a brine control for a water conditioning system wherein various desired quantities of brine from a brine tank can be controlled by the mere setting of a switch element which then will accurately regulate the desired quantity thus permitting the control to be utilized in various systems either for the home or for commercial and industrial use wherein more or less brine may be desired to be removed from the tank.

It is a further object to provide an accurate control means designed to shut off the liquid flowing to a brine tank and including a dial adjustment on the pressure response switch whereby accurate control of the brine removed may be dialed in a simple manner.

These and other objects will become more readily apparent from a reading of the description when read in connection with the accompanying sheets of drawings.

FIG. 1 is a side elevational view of an improved water conditioning system showing a sectional view of a brine tank and control means provided therefor;

FIG. 2 is a schematic view of a water conditioning system showing a cross-section through an improved electrical pressure responsive switch combined in the system;

FIG. 3 is a perspective view of portions of an electrical switch showing an improved construction whereby the amount of brine removed from a brine tank may be easily dialed by simply setting a switch;

FIG. 4 is a detailed perspective view of several of the switch elements shown in FIG. 3;

FIGS. 5, 6, and 7 are side elevational views in diagrammatic form showing different positions in which switch elements may be set to regulate the amount of brine removed from a brine tank;

FIG. 8 is a detailed perspective view of several portions of an improved solenoid valve;

FIG. 9 is a side elevational view through an improved solenoid valve showing schematically a solenoid coil therefor; and FIG. 10 is a side elevational view of the solenoid valve shown in FIG. 9 in a closed position.

Referring now particularly to FIGS. 1 and 2 a water softening system is generally designated by the reference character 10. The system 10 comprises a water conditioning tank or chamber 11 having connected thereto an electrical control valve 12 more specifically disclosed in applicant's aforementioned patent. The electrical control valve 12 is also connected to a solenoid valve 13 in turn connected to a drain line 14. A water inlet line 15 is connected to the electrical valve 12 which in turn by means of an inlet connection 16 is connected to the tank 11. The electrical valve 12 is provided with a venturi type injector 17 or vacuum producing means of conventional construction and also disclosed in the aforementioned patent. The injector 17 communicates with a conduit 18 in turn also connected to the tank 11 and also to an outlet 19 extending to the house water system.

A brine connection 20 extends from the vacuum means or injector 17 to a solenoid valve more adequately shown in FIGS. 8, 9, and 10. The solenoid valve 21 comprises a first connection or chamber 23 in turn communicating by means of a conduit 23' with a brine chamber or tank 24 as best shown in FIG. 1. The brine chamber 24 comprises a grid table 25 having a plurality of openings 26 and being suitably supported by means of supports 27. Salt 28 is placed upon the grid table 25 and the water level is so regulated as to be slightly above the grid table 25 whereupon brine below the grid table is provided. The valve 21 is also provided with a second chamber 29 and a tubular valve seat 30 is adapted to provide for communication between the first chamber 23 and a second chamber 29. A flexible valve element diaphragm 31 as best shown in FIG. 8 is suitably clamped within the valve 21 as indicated at 32 by means of a cover element 33 having flanges 34 which provide a third chamber designated at 35. The flexible valve element 31 also includes a centrally located conical opening 36 adapted to be closed by means of a conical end 37 of a plunger 38 which is normally urged downwardly into the position indicated in FIG. 9 by means of a spring 39. The valve element 31 also includes a bleed opening 40 which is closed by means of a check valve 41. The plunger 38 is suitably guided in a tubular guide 42 integral with the cover element 33. A conventional solenoid coil is disclosed in FIGS. 2 and 9 the details of which are conventional and are not further disclosed.

Referring now particularly to FIGURES 2, 3, and 4 through 7 an electrical pressure responsive switch is designated at 44 and includes a pair of separable housing members 45 and 46. The switch also includes a flexible diaphragm 47, which as shown in FIG. 2 separates the switch into a pressure chamber 48 and a switch chamber 48'. A conduit 49 from the pressure chamber 48 extends down into the brine well below the grid table 25 and has connected thereto an enlarged bell-type of tubular element 50 providing a continuation of the pressure chamber 48.

Referring now particularly to FIGURES 3 and 4 the switch 44 includes a support plate 51 suitably connected to the switch housing element 46. The support plate 51 has connected thereto a contact element 52 which in turn includes a vertically extending support 53 which serves to support and pivot a switch element 54. The switch element 54 has a pair of legs 55 spread apart and straddling portions of the vertical support 53 the said legs including overlapping edges 56 to suitably support the said element 54 in relative pivoting or hinging relation with respect to the support 53. The switch element 54 has connected thereto a spring 57 which in turn extends through an opening 58 in the vertical support 53 and is connected to one end of a hinging arm 59. The arm 59 has a reduced section portion 60 which is disposed in a recess 61 provided in the upper end of the support 53. The arm thus may hinge about the support 53 and one end 59′ is engageable with the diaphragm 47 of the switch element 54. The switch element 54, as is shown in FIG. 4, includes a contact 62 which is adapted to engage a contact or terminal 63 provided on the support plate 51. Upon decrease in pressure in chamber 48 the switch element 54 (which is hinged to part 53 below arm 59, see FIGURES 3, 5, 6 and 7) is pulled down by the spring 57 (which is moved down by the arm 59) past hinge connection of element 54 to member 53, the spring 57 operating as an overcenter spring to pull the contact 62 of element 54 down to touch contact 63 (as seen in FIGURES 2, 5, 6 and 7). Upon an increase in pressure in chamber 48, in reverse manner, the arm end 59′ moves inwardly toward element 54 and the other arm end of arm 59 moves outwardly to raise the contact end of element 54 (via spring 57) away from contact 63 for de-energization or breaking of electrical contact, i.e. spring 57 raises above hinge connection of element 54 as seen by FIGURES 2, 5, 6 and 7.

A brine dial control is designated at 64 and comprises a knob 65 having a stem 66 which extends through the opening 67 of the housing member 46. The stem 66 is rigidly connected to a plate portion 67 for rotating the same, the said plate portion having a stop element 68 of U-shaped configuration. As best shown in FIG. 4 the stop element 68 is disposed directly above the contact 62 and tapers in such a manner that upon rotation of the stem 66 the stop member 68 pivots and the dimension A as shown in FIG. 4 increases or decreases depending upon the position of the stop member 68 in its pivotal rotation.

As best shown in FIG. 2 the switch is suitably connected to an electrical source by means of an electrical plug-in-connector 70 having one electrical conductor line 71 extending to the coil 43. Another conductor line 72 extends from the coil 43 to the dial contact element 62 and electrical conductor 73 extends from the electrical plug-in-connector 70 to the contact element 52.

The operation

The operation of the water softening system 10 is conventional and is well described in the patent above referred to. During the brine cycle the injector 17 provides a source of vacuum which in turn provides a suction on the conduit 22. At this point the valve 21 is non-electrically energized and the plunger 38 is in the position shown in FIG. 9. As the suction is applied, the valve element 31 is moved to the open position of FIG. 9. This is accomplished in that a pressure differential exists between chambers 23 and 29, a small portion of liquid flows through the bleed opening 40 from chamber 35, leaking by check valve 41, and the valve element 31 thus rises from its valve seat 30 causing the brine to flow in the direction of the arrows as indicated. The brine continues to flow from the brine tank 24 to the conditioner tank 11 and as the level within the brine tank 24 decreases air pressure in the pressure chambers 48 and 50 correspondingly decreases so that the diaphragm 47 moves to the right, as shown in FIG. 2, whereupon the arm 59 which is urged by the spring 57 into engagement with the diaphragm, is moved to the maximum position as indicated in FIGS. 2 and 7. Just prior to the movement of the arm 59 to its maximum position shown in FIG. 7 the switch element 54 and its contact 62 has been in a non-contact or a non-energizing position with respect to the switch contact 63. In other words the switch element 54 has during this brine cycle been in an open position with the stop member 68 being engaged by the contact 62 and the spring 57 thus has held the contact in this position. However as the arm 59 reaches its maximum position this pivotal movement of the arm 59 changes the relative position of the end of the spring to which it is connected so that the switch element 54 now flips downwardly into contacting or energizing relation with respect to the contact 63. As this occurs, the solenoid 43 causes the plunger to assume the position shown in FIG. 10 wherein the plunger is moved to open the conical opening 36 thus providing communication between the chambers 35 and 23. Brine now flows into the chamber 35 and the differential in pressure on the upper surface of the valve element 31 causes the valve element to assume the closed position shown in FIG. 10 and the brine flow ceases to the water conditioning tank. The check valve 41 is now in a closed position.

The operation of the water softening apparatus, as explained in my U.S. Patent No. 3,130,154, is initiated by a timer which actuates the solenoid valve 13 for opening flow from valve 12 to allow water from the main source to flow into inlet 15 through valves 12 and 13 to drain 14 and to tank 11 by conduit 16 and out of tank 11 via conduit 52 and creating a suction via suction means 17 in lines 22 and 23′ for flow of brine from the brine tank 24 to the water softening tank 11 so long as valve 21 remains open. Brine flow to tank 11 stops when check valve 41 closes, as explained above. Next time the timer closes the solenoid valve 13 and the suction means 17 ceases to operate terminating suction in line 22 and valve 12 directs the water from main line 15, as described in the aforementioned U.S. Patent No. 3,130,154, to conduit 18 to tank 11 and to conduit 22 to valve 21 to brine tank 24. The pressure on the underside of the diaphragm 31 against the low pressure or vacuum condition in chamber 35 allows unseating of diaphragm 31 and liquid then flows from passage 22 into passage 23 to conduit 23′ to brine tank 24.

The water conditioner may now be controlled to provide fresh water through the conduits 22 and 23′ to the brine tank whereupon water now flows to the brine tank and as the water level rises within the brine tank the pressure within the pressure chambers 48 and 50 is increased thus causing the diaphragm 47 to move to the left as shown in FIG. 2 whereupon the arm 59 is pivoted on the support 53. As the rear end of the arm 59 moves upwardly and the forward portion 59′ moves downwardly the pivot position of the spring 57 relative to the switch element 54 is changed so that the switch element 54 flips upwardly away from the contact 63 and the upward movement is immediately stopped by means of the stop element 68 which is disposed over the contact 62. At this point the solenoid plunger 38 drops back into the position shown in FIG. 9 and water going to the brine tank is now prevented by a closure of the plunger 38 and the valve element 31 being in engagement with the valve seat 30. Water now flowing through the bleed opening 40 into chamber 35 and the pressure differential causes the valve element 31 to assume the closed position. Thus the flow ceases when the accurate level within the brine tank is achieved.

After the brine cycle has been completed the check valve prevents leakage of brine through the bleed opening 40 so as to prevent brine from entering into the conditioning system after the brine cycle has been completed.

It is a simple matter for the switch to be adjusted to the three levels of low, medium or high as shown in FIGS. 1 and 2. These designations merely indicate that the high is the greatest amount of brine desired to be removed, the medium is the next highest, and the low is the smallest amount of brine which is desired to be removed. Before energization by the contacts 62 and 63 touching another, the contacts must travel a certain distance relative to each other. The further apart or higher up contact 62 of element 54 is from contact 63, the higher contact 62 is relative to hinge connection of element 54. The spring 57 is also higher above hinge connection of element 54 to member 53. Therefore, the arm end 59′ must move farther outward or upward to swing the other end of arm 59 downward past the hinge connection of element 54 to drop the spring 57 below the hinge connection of element 54 to lower element 54. Since arm 59 must move outward a greater distance for contact energization, more time is required before energization takes place to terminate brine removal. Thus, in the non-energized position of switch contacts 62 and 63, the spring 57 and switch element 54 can be held at various positions above the hinge connection of element 54 to member 53 by the dial 64 whereby its vertically sloped surface is allowed to limit upward movement of the element 55 above the hinge connection and the amount of brine supplied can be thus varied. Thus it is a simple matter to dial, by means of the dial 64 the amount of brine which the particular size water conditioner requires and thus the same switch and solenoid valve may be utilized for either commercial, industrial, or home type of units where larger or smaller water conditioning tanks are needed. By moving the stop member 68 the dimension A, of FIGURE 4, may be increased or decreased thus setting the contact in closer proximity or farther proximity during its non-engaging position. This is particularly well shown in FIGS. 5, 6 and 7. In FIG. 5 where only a small amount of brine is to be removed the contact 62 has flipped or snapped back into contact 63 from its stop position with the arm 59 only permitted to move with the diaphragm a short distance since there has only been a slight pressure drop in the pressure chamber with the small amount of brine removal. In FIG. 6 the contact 62 has snapped back into contact position relative to the contact 63 with an additional greater movement of the diaphragm which of course indicates that a greater amount of brine is being taken out. Similarly in FIG. 7 the high or maximum brine setting provides snapping of the switch contact 62 into its engaging position with contact 63 only when the arm has moved its maximum position as indicated herein. This of course is accomplished by changing the dimension A whereupon the switch contact 62 is moved closer or further depending upon the desired brine level to be obtained after the brine is removed. By this change in dimension A, the tension of the spring 57 changes which of course also results in slower or faster closing action of the contacts. In this way the amount of brine can accurately be controlled by means of the switch.

Thus it is believed that the objects of the invention have been fully achieved and that an improved control is provided for a fluid transfer or water conditioning system. It is of course recognized that changes and modifications may be made without departing from the spirit of the invention as disclosed or from the scope thereof as defined in the appended claims.

What is claimed is:

1. In a water conditioning system comprising a conditioning chamber, and a brine chamber, for containing a liquid at a predetermined level, vacuum means being in fluid communication with said conditioning chamber and said brine chamber, conduit means connecting said chambers, said conduit means being connected to said vacuum means and providing for the flow of brine in one direction from said brine chamber to said conditioning chamber and providing for the flow of water in a second direction from said conditioner chamber to said brine chamber;
   (a) a brine level control device comprising,
   (b) an electrically energized valve connected to said conduit means for regulating the flow of fluid thereto, said valve including a valve element having a fluid pressure responsive closure part and a valve operating part which when said valve is not electrically energized said valve closure part is closed with respect to the flow of water to said brine chamber,
   (c) a pressure responsive switch electrically connected to said valve operating part,
   (d) said switch including contact means and a switch element being engageable with said contact means to establish an electrical circuit to close said valve closure part,
   (e) pressure responsive means being operatively connected with said switch and including a pressure chamber connected to said brine chamber for sensing increase in pressure in said brine chamber during a rise in the liquid level in said brine chamber whereby said pressure responsive means moves said switch element to disengage from said contact means, said valve operating part is de-energized and said valve closure part is moved to a closed position,
   (f) said valve element closure part having one side exposed to said vacuum means and being movable in response to suction from said vacuum means whereby said valve element closure part opens and brine fluid is drawn through said conduit means from said brine chamber to said conditioning chamber,
   (g) said pressure responsive means sensing a pressure drop in said pressure chamber whereby when the predetermined level in said brine chamber is reached said pressure responsive means moves said switch element into engagement with said contact means and said valve operating part is energized whereby said valve element closure part is closed and the flow of brine ceases,
   (h) and setting means connected to said switch and being positioned with respect to the switch element to limit movement thereof to control the time of engagement between the switch element and the contact means and the setting means being movable into a plurality of positions to vary the proximity of the switch element relative to said contact means whereby each position predetermines a different quantity of brine which may flow from said brine chamber before said switch element engages said contact means and said valve closure part is closed.

2. For a water conditioning system in accordance with claim 1, said valve comprising a first chamber, a second chamber, and a third chamber, said valve closure part having a flexible diaphragm valve disposed between said first, second and third chambers for regulating the flow of fluids between the first and second chambers, said diaphragm valve having a first opening adapted to provide for communication between said second and third chambers, said diaphragm valve including a second opening providing communication between said first and third chambers, and said valve operating part including a valve plunger normally closing said first opening and being movable from said first opening during energization of said valve whereby said diaphragm valve isolates said first and second chambers with respect to each other.

3. For a water conditioning system in accordance with claim 2, said diaphragm valve including a check valve means for limiting the flow through said second opening.

4. For a water conditioning system in accordance with claim 1, said pressure responsive switch including a flexible diaphragm movable in one direction during a rise in pressure in said pressure chamber and in a second direction in response to a decrease in pressure in said pressure chamber, means for moving said switch element including an arm pivotally connected to said switch, means interconnecting said arm and said switch element whereby during pivoting movement of said arm in one direction said switch element engages said contact means, and in another direction said switch element is disengaged from said contact means, said arm being engaged and moving with said diaphragm.

5. For a water conditioning system in accordance with claim 4, said setting means including a manually movable member.

6. In a fluid transfer system comprising a first chamber, and a second chamber for containing a liquid at a predetermined level, vacuum means being in fluid communication with said first and second chambers, conduit means connecting said chambers, said conduit means being connected to said vacuum means for providing for the flow of fluid in one direction from said second chamber to said first chamber and also providing for the flow of fluid in a second direction from said first chamber to said second chamber;

(a) a brine level control device comprising, (b) an electrically energized valve connected to said conduit means for regulating the flow of fluid thereto, said valve including a valve element having a fluid pressure responsive closure part and a valve operating part which when said valve is not electrically energized said valve closure part is closed with respect to the flow of fluid to said second chamber, (c) a pressure responsive switch electrically connected to said valve operating part, (d) said switch including contact means and a switch element being engageable with said contact means to establish an electrical circuit to close said valve closure part, (e) pressure responsive means being operatively connected with said switch and including a pressure chamber connected to said second chamber for sensing increase in pressure in said second chamber during a rise in the liquid level in said second chamber whereby said pressure responsive means moves said switch element to disengage from said contact means, said valve operating part is de-energized and said valve closure part is moved to a closed position, (f) said valve element closure part having one side exposed to said vacuum means and being movable in response to suction from said vacuum means whereby said valve element closure part opens and fluid is drawn through said conduit means from said second chamber to said first chamber, (g) said pressure responsive means sensing a pressure drop in said pressure chamber whereby when the predetermined level in said second chamber is reached said pressure responsive means moves said switch element into engagement with contact means and said valve operating part is energized whereby said valve element closure part is closed and the flow of the fluid to the second chamber ceases, (h) and setting means connected to said switch being positioned with respect to the switch element to limit movement thereof to control the time of engagement between the switch element and the contact means and the setting means being movable into a plurality of positions to vary the proximity of the switch element relative to said contact means whereby each position predetermines a different quantity of fluid which may flow from said second chamber before said switch element engages said contact means and said valve closure part is closed.

7. A pressure responsive switch for a fluid transfer system including first and second chambers connected by a conduit, an electrical valve for placement in said conduit and connected to said switch and energizable for controlling the flow of fluid through said conduit, comprising, a switch casing having a pressure chamber for communication with one of said first and second chambers, a flexible diaphragm in said switch movable in response to pressure within the pressure chamber, first and second contact elements on said switch, a support on the switch, a switch element pivotal on said support, an arm pivotal between its end on said support and having one end engageable and movable by said diaphragm, spring means connecting said other end of the arm and the switch element above the pivotal connection of the switch element to the support whereby during movement in one direction of said arm said spring means moves below the pivotal connection and said switch element engages said second contact element, and whereby during movement in a second direction said spring means moves above the pivotal connection and said switch element is disengaged, and adjustable stop means on said switch movable to a plurality of positions for varying the proximity of said switch element relative to said second contact means in the disengaged position to vary the movement of the arm, whereby said arm may move in one direction a greater extent before said switch element is moved into engagement with said second contact means.

8. In a fluid transfer system including first and second chambers, a conduit including first and second portions respectively connecting said first and second chambers, a source of vacuum connected to said first conduit portion for sucking fluid through said portions from said second chamber to said first chamber; an electrically controlled valve including a housing having a first connection communicating with said first conduit portion, and a second connection communicating with said second conduit portion, a valve seat having a first opening disposed between said first and second connections within said housing, a diaphragm between the connections and connected within said housing and including a valve element engageable with said valve seat to regulate the flow of fluid through said first opening, said diaphragm and said housing providing a third chamber, said diaphragm having a second opening and a third opening, flow control means for said third opening, said second opening communicating with said third chamber and said second connection, and said third opening providing communication between said third chamber and said first connection, an electrically actuated means in said third chamber engageable with said second opening to close said second opening whereby during a suction on said first connection fluid is initially drawn from said third chamber to said first connetcion through said third opening and said diaphragm and actuated means are moved from said valve seat and fluid is drawn from said second chamber to said first chamber, and electrically actuating means for moving said actuated means from said second opening to an open position, whereby fluid from said second connection enters said third chamber providing a pressure differential in said third chamber and on said diaphragm to seat said valve element in a closed position.

9. In a fluid transfer system in accordance with claim 8, said electrically controlled valve including a check valve for closing said third opening when said valve element is in the closed position.

10. The invention according to claim 8 and said electrically actuated means including switch means and switch setting means to set the time for operation of said switch means.

11. In a fluid transfer system including first and second chambers, a conduit including first and second portions respectively connecting said first and second chambers, a source of vacuum connected to said first conduit portion for drawing fluid through said portions from said second chamber to said first chamber; an electrically controlled valve including a housing having a first connection communicating with said first conduit portion, and a second connection communicating with said second conduit portion, a valve seat having a first opening disposed between said first and second connections within said housing, a diaphragm between the connections and connected within said housing and including a valve element engageable with said valve seat to regulate the flow of fluid through said first opening, said diaphragm and said housing providing a third chamber, said diaphragm having a second opening, said second opening communicating with said third chamber and said second connection, and communicating means providing communication between said third chamber and said first connection, an electrically actuated means in said third chamber engageable with said second opening to close said second opening whereby during a suction on said first connection fluid is initially drawn from said third chamber to said first connection through said communicating means and said diaphragm and actuated means are moved from said valve seat and fluid is drawn from said second chamber to said first chamber, and electrically actuating means for moving said actuated means from said second opening to an open position, whereby fluid from said second connection enters said third chamber providing a pressure differential in said third chamber and on said diaphragm to seat said valve element in a closed position.

12. In a fluid transfer system in accordance with claim 11, said electrically controlled valve including means for closing said communicating means when said valve element is in the closed position.

13. The invention according to claim 12 and said electrically actuated means including switch means and switch setting means to set the time for operation of said switch means.

14. The invention according to claim 12 and said means for closing said communicating means comprising a valve.

15. The invention according to claim 12 and said means to close said communicating means comprising a flapper valve mounted in the third chamber.

16. A pressure responsive switch comprising a switch casing having a pressure chamber, a flexible diaphragm in said switch movable in response to pressure within the pressure chamber, first and second contact elements on said switch, a support on the switch, a switch element pivotal on said support, an arm pivotal between its ends on said support and having one end engageable and movable by said diaphragm, spring means connecting said other end of the switch element above the pivotal connection of the switch element to the support whereby during movement in one direction of said arm said spring means moves below the pivotal connection and said switch element engages said second contact element, and whereby during movement in a second direction said spring means moves above the pivotal connection and said switch element is disengaged, and adjustable stop means on said switch movable to a plurality of positions for varying the proximity of said switch element relative to said second contact means in the disengaged position to vary the movement of the arm, whereby said arm may move in one direction a greater extent before said switch element is moved into engagement with said second contact means.

17. A pressure responsive switch operable by a movable element comprising a support, a first switch arm pivotally supported intermediate its end portions on the support at a first pivotal connection and having one end portion for engagement with said element and pivotally moving in accordance with the movements of the element, a second switch arm having end portions one of which is pivotally supported on said support at a second pivotal connection, the first connection being between the second connection and the one end portion of the first arm, a first fixed electrical contact, a second electrical contact carried on the other end portion of the second arm and engageable with said first contact for completing an electrical circuit, resilient means connected with the other end portions of each of the arms so that the resilient means may be carried by the other end portion of the first arm above and below the second connection for moving the other portion of second arm above and below the second connection for breaking and making an electrical circuit, and means for limiting movement above the second connection toward the one end portion of the first arm.

18. The invention according to claim 17 and said last mentioned means comprising an adjustable stop operatively engageable with said other end portion of the second arm to vary the movement of the other end portion of the second arm before engagement of the contacts with one another can occur.

19. The invention according to claim 17 and said element being in combination with the switch and comprising a flexible diaphragm subject to variations in pressure.

20. A pressure responsive electrical device including:
 (a) a housing having a pressure responsive diaphragm means therein;
 (b) switch means associated with said pressure responsive means having:
  (1) a first contact,
  (2) an actuating arm member operatively connected to said pressure responsive means for movement therewith; and
  (3) a second contact member responsive to movement of said arm member to close with said first contact in the first position and shifted from closure with said first contact in a second position; and
  (4) biasing means operatively connecting said actuating arm member and said second contact to provide a snap switch movement to said second contact in response to movement of said actuating arm member; and
 (d) means for varying the distance of said second contact member from said first contact when said second contact is shifted to said second position.

21. The structure set forth in claim 20 and said varying distance means including a moveable stop element arranged in generally overlying relation to said second contact with distance controlling means for shifting said stop element.

22. The structure set forth in claim 21 and said stop element including a bar member disposed in inclined relation over said second contact with means for shifting said bar relative to said contact.

23. The structure set forth in claim 22 which includes a pair of downwardly disposed stops on the respective ends of said bar member to prevent overshifting of said bar member past said second contact.

24. A pressure responsive electrical device including:
 (a) a housing;
 (b) a flexible pressure responsive diaphragm member within the housing providing a pressure chamber and a switch chamber;
 (c) switch means mounted in said switch chamber and associated with pressure responsive means including:
  (1) a first stationary contact;
  (2) a second moveable contact shiftable from a first position engaging said first contact into a second controllable position;
  (3) an actuating lever arm operatively connected to said pressure responsive member for movement therewith, and
  (4) spring means operatively connecting said actuating arm lever and said second moveable contact to provide a snap switch movement to said second contact in response to movement of said actuating arm lever;
 (d) means for controlling said moveable contact lever in said second position to control the distance between said contact when said moveable contact is in said second position.

25. The structure set forth in claim 24 wherein said means for controlling said moveable stop member include an inclined stop plate generally overlying said moveable member and means for shifting the same relative to said moveable member.

26. A fluid transfer control system for providing and withdrawing a fluid chamber with a predetermined quantity of fluid, said system including:

(a) a fluid chamber;
(b) an inlet for providing fluid to said chamber;
(c) an outlet for withdrawing fluid from said chamber;
(d) electrically responsive valve means for controlling said inlet and said outlet;
(e) a source of vacuum connectable to said outlet for withdrawing fluid from said chamber;
(f) a pressure responsive control member communicating with and responsive to the pressure in said fluid chamber having:
  (1) a housing;
  (2) a pressure responsive means within said housing;
  (3) a pressure conduit communicating with said pressure responsive means and with the fluid in said chamber conducting higher pressures when the level in said chamber is raised and conducting lower pressures when the fluid level in said chamber is lowered;
  (4) switch means associated with and responsive to said pressure responsive means and controlling said valve energizing said valve means when the fluid in said chamber is withdrawn by vacuum applied thereto to a first lower level and de-energizing said valve means when the fluid in said chamber reaches a predetermined higher level.

27. The structure set forth in claim 26 and said switch means including:
(a) a first contact;
(b) a second contact;
(c) means operatively connecting one of said contacts to said pressure responsive means to close said contacts in one position and open said contacts in a second position; and
(d) means for adjusting the distance between said contacts in said second position.

References Cited

UNITED STATES PATENTS

| | | | |
|---|---|---|---|
| 3,044,626 | 7/1962 | Rose | 210—191 X |
| 3,130,154 | 4/1964 | Haskett | 210—140 X |
| 3,130,155 | 4/1964 | Haskett | 210—191 X |
| 3,181,564 | 5/1965 | Rudelick | 210—190 X |

REUBEN FRIEDMAN, *Primary Examiner.*

J. ADEE, *Assistant Examiner.*

U.S. Cl. X.R.

210—136, 190; 200—83; 137—571; 251—30